Feb. 16, 1960  W. E. SAXE  2,925,079
ICE BREAKING APPARATUS
Filed May 2, 1957  5 Sheets-Sheet 1

INVENTOR.
WALTER E. SAXE,
By His Attorneys.
HARRIS, KIECH, FOSTER & HARRIS.

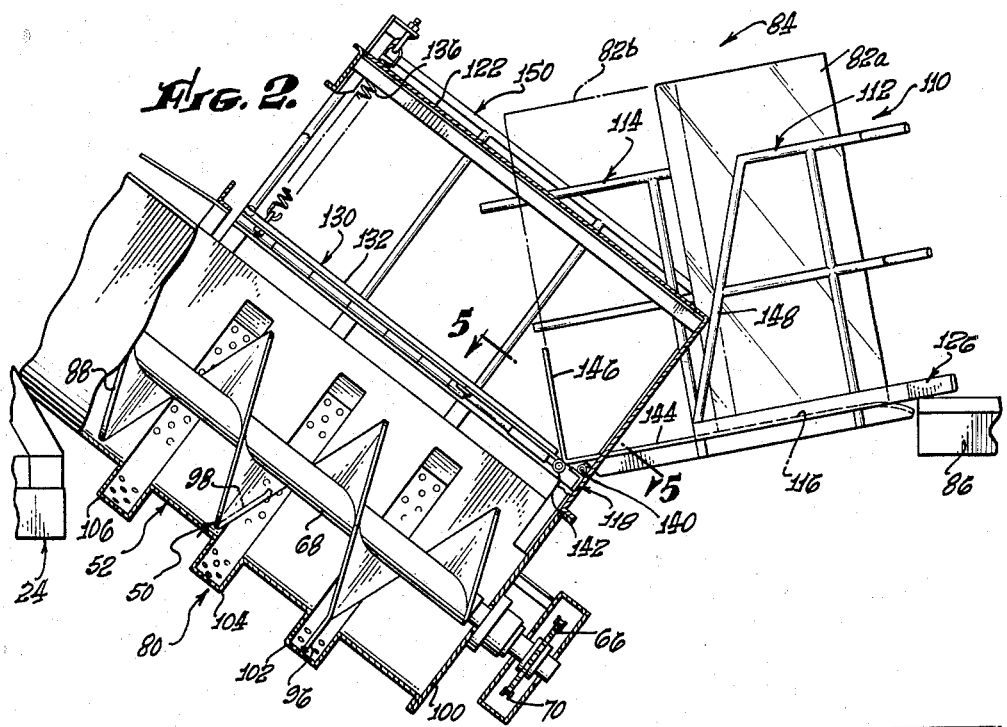
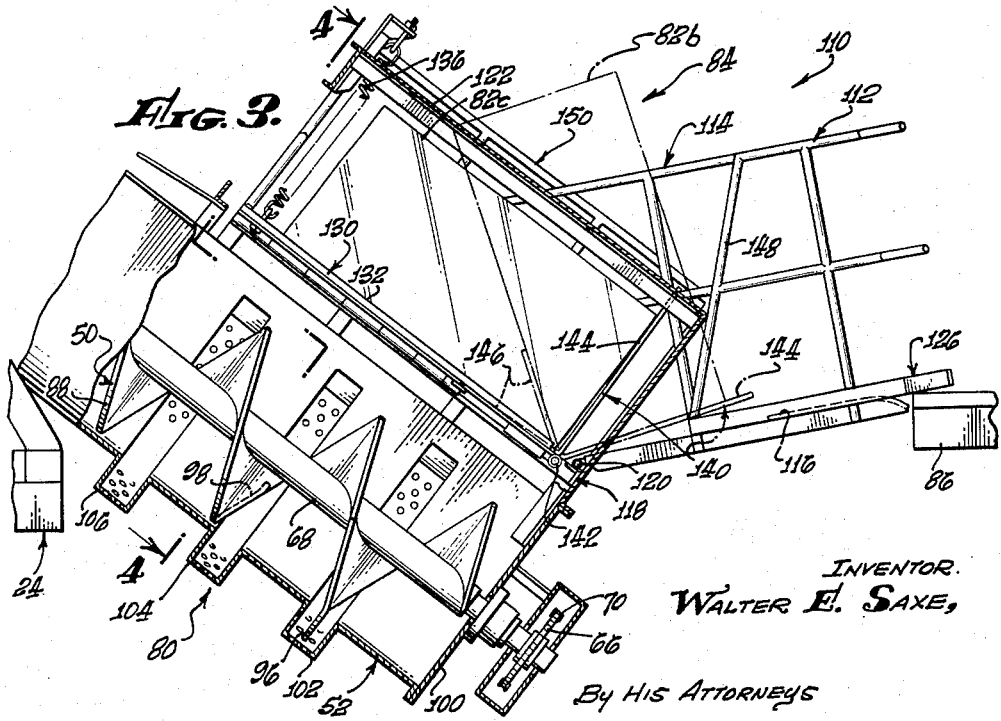

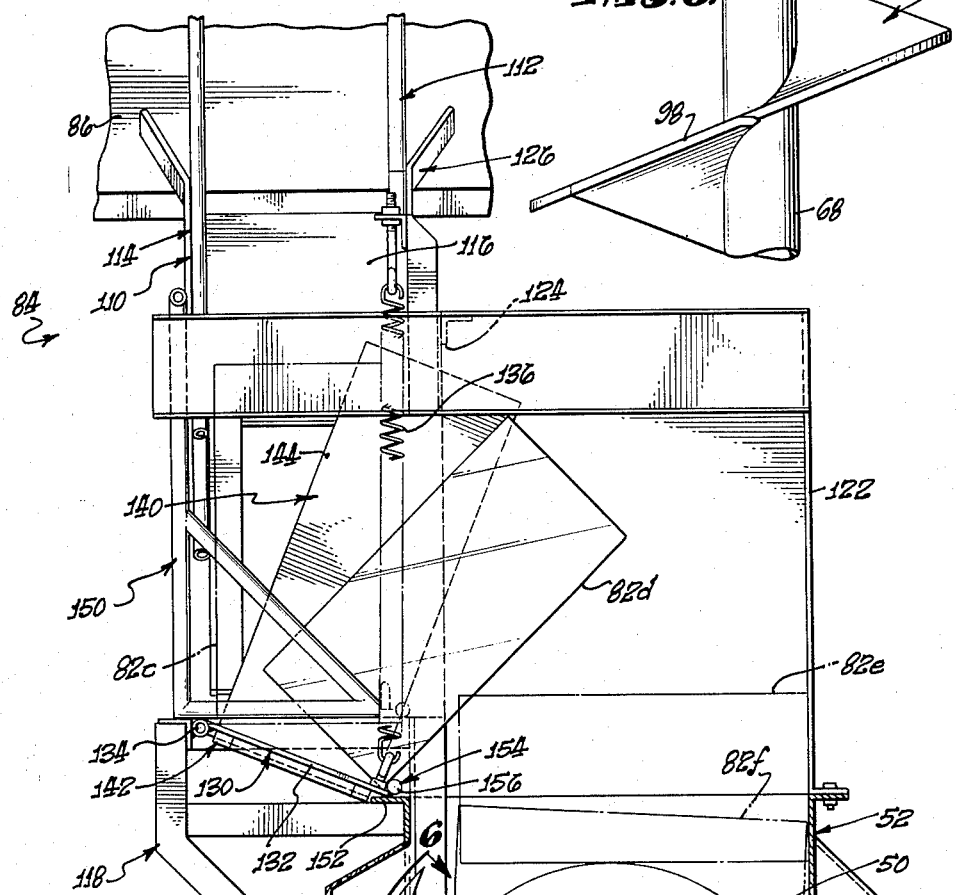

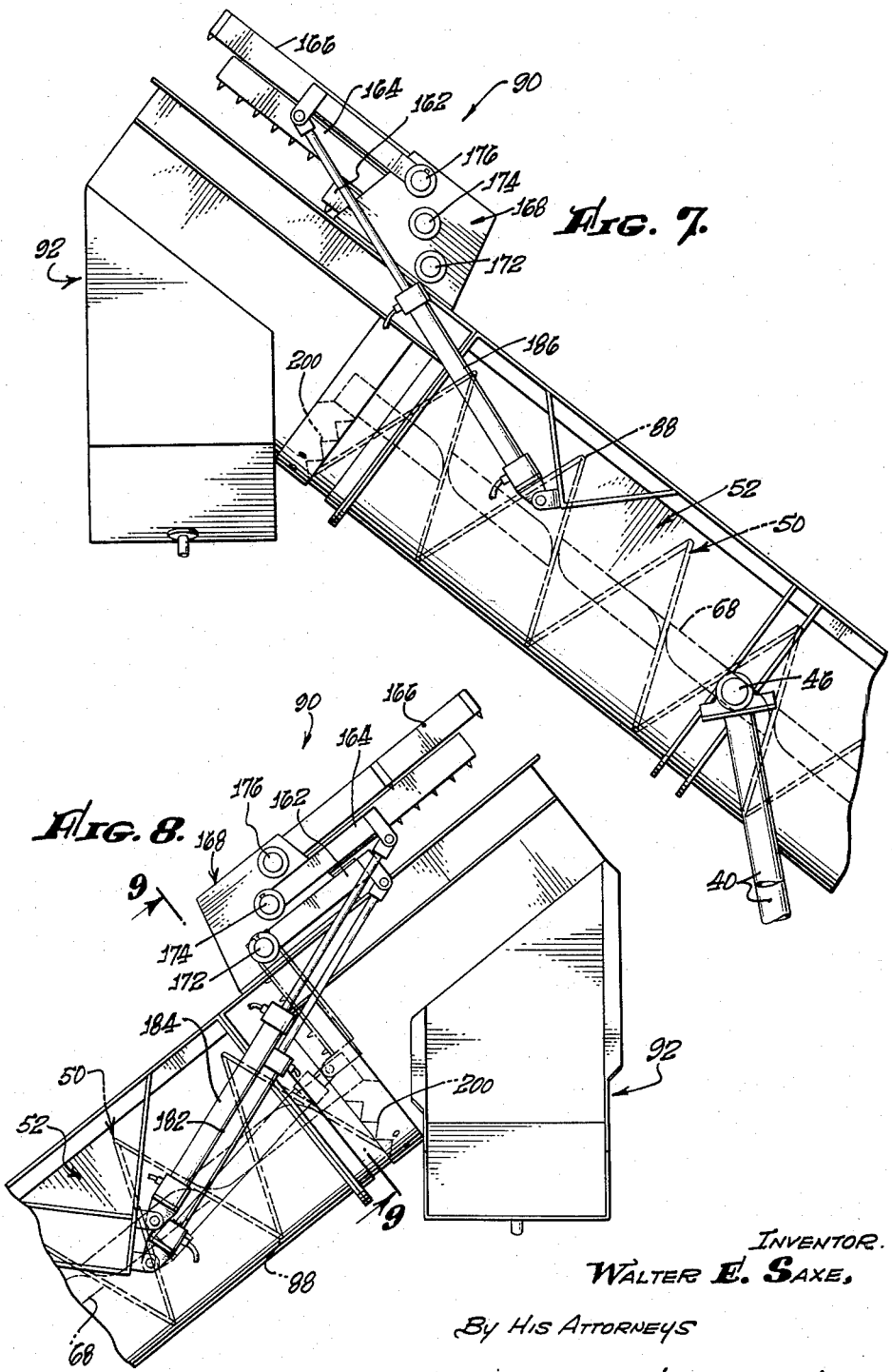

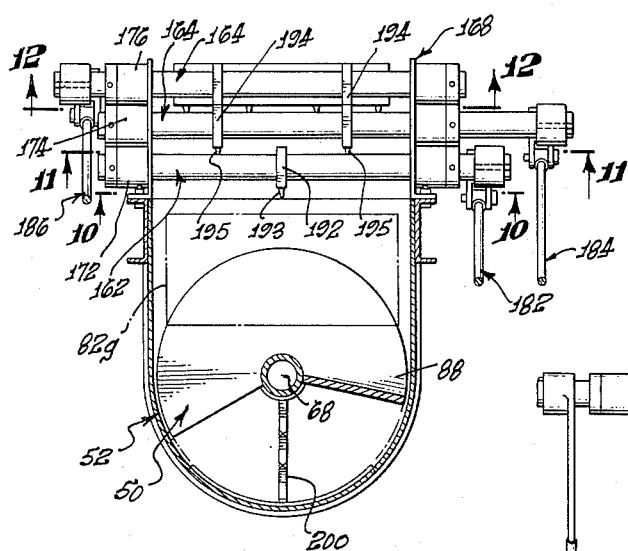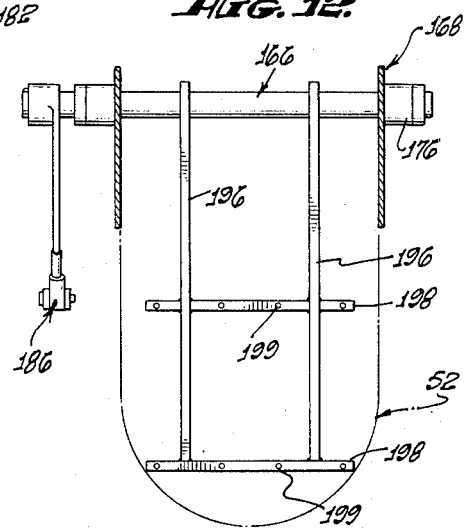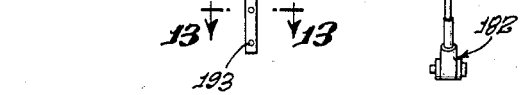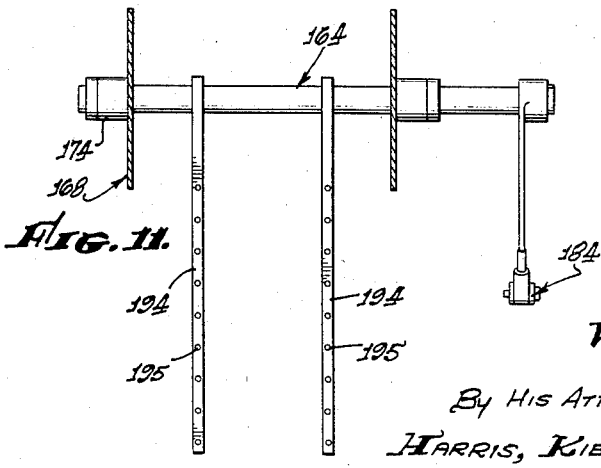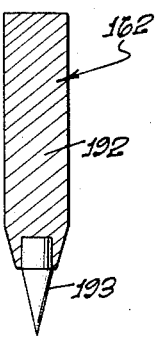

United States Patent Office 2,925,079
Patented Feb. 16, 1960

2,925,079

ICE BREAKING APPARATUS

Walter E. Saxe, Pasadena, Calif., assignor to The Conveyor Company, Los Angeles, Calif., a corporation of California Application May 2, 1957, Serial No. 656,631

20 Claims. (Cl. 125—23)

This invention has for its purpose the provision of an ice breaking apparatus and, more particularly, an apparatus for breaking large blocks of ice into smaller blocks of various predetermined, controlled sizes with a minimum proportion of small fragments, a primary object of the invention being to provide an ice breaking apparatus having such characteristics.

Generally speaking, the present invention contemplates an ice breaking apparatus which includes screw conveyor means having inlet and outlet ends and comprising a screw conveyor rotatable in a suitable screw conveyor housing. Means for loading large blocks of ice into the ice breaking apparatus is provided adjacent the inlet end of the screw conveyor means and a suitable discharge means for conducting small blocks of ice produced by the ice breaking apparatus to suitable points of disposal may be provided adjacent the outlet end of the screw conveyor means. The points of disposal mentioned may, for example, be the charging hatches of the ice compartments of refrigerated freight cars. Since such charging hatches are conventionally located on the tops of refrigerator cars and since it is convenient to locate the loading means mentioned adjacent ground level, the screw conveyor means preferably slopes upwardly from its inlet end to its outlet end in such an environment, although this is not essential to the present invention.

One object of the invention is to provide an ice breaking apparatus which includes ice breaking means comprising circumferentially extending picks or teeth on certain of the convolutions of a helical flight of the screw conveyor adjacent the inlet end thereof. Thus, when a large block of ice is moved into engagement with the toothed convolutions of the screw conveyor flight, preferably by moving such block downwardly into engagement therewith, the teeth break the block into smaller blocks, hereinafter referred to as intermediate blocks for reasons which will become apparent, each receivable between adjacent convolutions of the conveyor. These intermediate blocks are then transported by the conveyor to the outlet end of the screw conveyor means.

The foregoing ice breaking means fractures the large block of ice into blocks of predetermined intermediate size adapted to fit between the convolutions of the screw conveyor flight with minimum formation of small fragments, which is an important feature. By increasing or decreasing the number of teeth on the screw conveyor flight, the number of blocks of intermediate size formed from each large block may be varied as desired. Preferably, two teeth so located as to break a standard block of ice into three intermediate blocks of equal size are provided, but this number of teeth is not critical.

An important object of the invention is to provide means at the outlet end of the screw conveyor means for breaking the intermediate blocks into still smaller blocks, hereinafter referred to as small blocks for convenience. Another object is to provide at the outlet end of the screw conveyor means a mechanism which may be rendered operative to break the intermediate blocks into small blocks of various, controlled sizes, or which may be rendered inoperative if desired so that the blocks of intermediate size may be discharged from the outlet end of the screw conveyor means without a further reduction in size.

More particularly, an important object of the invention is to provide adjacent the outlet end of the screw conveyor means an ice breaking mechanism which includes a plurality of block splitting members each movable from an inoperative position clear of the outlet end of the screw conveyor means to an operative position wherein it extends at least part way across such outlet end so as to split into smaller blocks the intermediate blocks of ice extruded therepast by the screw conveyor.

Another object of the invention of considerable importance is to provide means for moving the block splitting members into their respective operative positions selectively so as to permit the formation of small blocks of various controlled sizes as required by the use to be made of the ice.

Another object is to provide block splitting members each having at least one bar carrying picks or teeth which face toward the inlet end of the screw conveyor means. Such block splitting members split the intermediate blocks into small blocks of the desired size cleanly with a minimum formation of small fragments, which is an important feature.

An important object of the invention is to provide a means for charging the ice breaking means formed by the toothed convolutions of the screw conveyor with blocks of ice which includes safety means for preventing delivery of a block of ice to the ice breaking means unless various components of the charging means are in predetermined positions. As will become apparent, this safety means also eliminates possible injury to personnel by the ice breaking means, which is an important feature.

Another object of the invention is to provide an ice breaking apparatus which includes means for delivering the large block of original size to the ice breaking means formed by the toothed convolutions at the inlet end of the screw conveyor when various components of the apparatus are in certain positions, and to provide means for preventing movement of the large block of ice into engagement with the ice breaking means when such components are not in such positions. More particularly, an object is to provide gate means movable from an operative position to an inoperative position to admit a block of ice to the ice breaking means, the gate means preventing movement of the block of ice into engagement with the ice breaking means when the gate means is in its operative position, and to provide means for preventing movement of the gate means from its operative position to its inoperative position under certain conditions.

Still another object of the invention is to provide transfer means mounted on the gate means for movement between a first position wherein it forms an extension of a loading means or chute and a second position wherein it forms an extension of the gate means, and to provide stop means, including interengageable elements on the loading means and on the transfer means, for preventing movement of the gate means into its inoperative position except when the transfer means is in its second position, the transfer means being biased towards its first position and being movable into its second position by a block of ice moved into engagement with the gate through the loading means.

With the foregoing construction, the gate means cannot be released for movement to its inoperative position to deliver a block of ice to the ice breaking means unless the transfer means has previously been moved into its recited second position by the block of ice. This interlock between the gate means, the transfer means and the loading means thus prevents inadvertent release of the gate means for movement to its inoperative position and thus serves as a safety device preventing not only unintentional delivery of a block of ice to the ice breaking means, but also eliminating the possibility of injury to personnel which might otherwise result from release of the gate means for movement to its inoperative position.

Another object of the invention is to provide a loading means which receives each large block of ice on end, i.e., with the longitudinal axis of the block generally vertical, and a transfer means which tips the block onto the gate means on edge, the transfer means being pivotable for this purpose.

A further object is to provide an ice breaking apparatus wherein the weight and inertia of a block of ice moving through the loading chute automatically pivots the transfer means from its first position to its second position so as to tip the block of ice onto the gate means on edge in the manner mentioned, thereby releasing the gate means for movement to its inoperative position to deliver the block of ice to the ice breaking means. With this construction, as soon as the transfer means has been pivoted into its second position in response to tipping of a large block of ice onto the gate means on edge, the gate means is automatically released for movement to its inoperative position to permit movement of the block into engagement with the ice breaking means. Such pivoting of the transfer means into its second position upon tipping of the block of ice onto the gate means on edge can be performed only by the block of ice itself, and cannot be performed accidentally in any other way, thereby providing the safety feature hereinbefore outlined.

Another object is to provide an ice breaking apparatus wherein the gate means is pivotable downwardly toward the ice breaking means into its inoperative position about a pivot axis substantially parallel to the axis of rotation of the screw conveyor, whereby the block of ice delivered to the ice breaking means upon release of the gate means for movement to its inoperative position moves downwardly onto the toothed convolutions of the screw conveyor under the influence of gravity.

An additional object of the invention is to provide means carried by the gate means for tipping the block of ice about its longitudinal axis onto the toothed convolutions of the screw conveyor on its side as the gate means pivots into ints inoperative position. Thus, the teeth on the screw conveyor act on the smallest dimension of the block for ease in fracturing the block into smaller blocks of intermediate size, which is an important feature.

The foregoing objects, advantages, features and results of the present invention, together with various other objects, advantages, features and results thereof which will be apparent to those skilled in the ice breaking art in the light of this disclosure, may be attained with the exemplary embodiment of the invention described in detail hereinafter and illustrated in the accompanying drawings, in which:

Fig. 2 is an enlarged, fragmentary sectional view illustrating the manner in which a large block of ice is delivered to an ice breaking means of the apparatus;

Fig. 3 is a view similar to Fig. 2, but showing various components in different operating positions;

Figure 1:
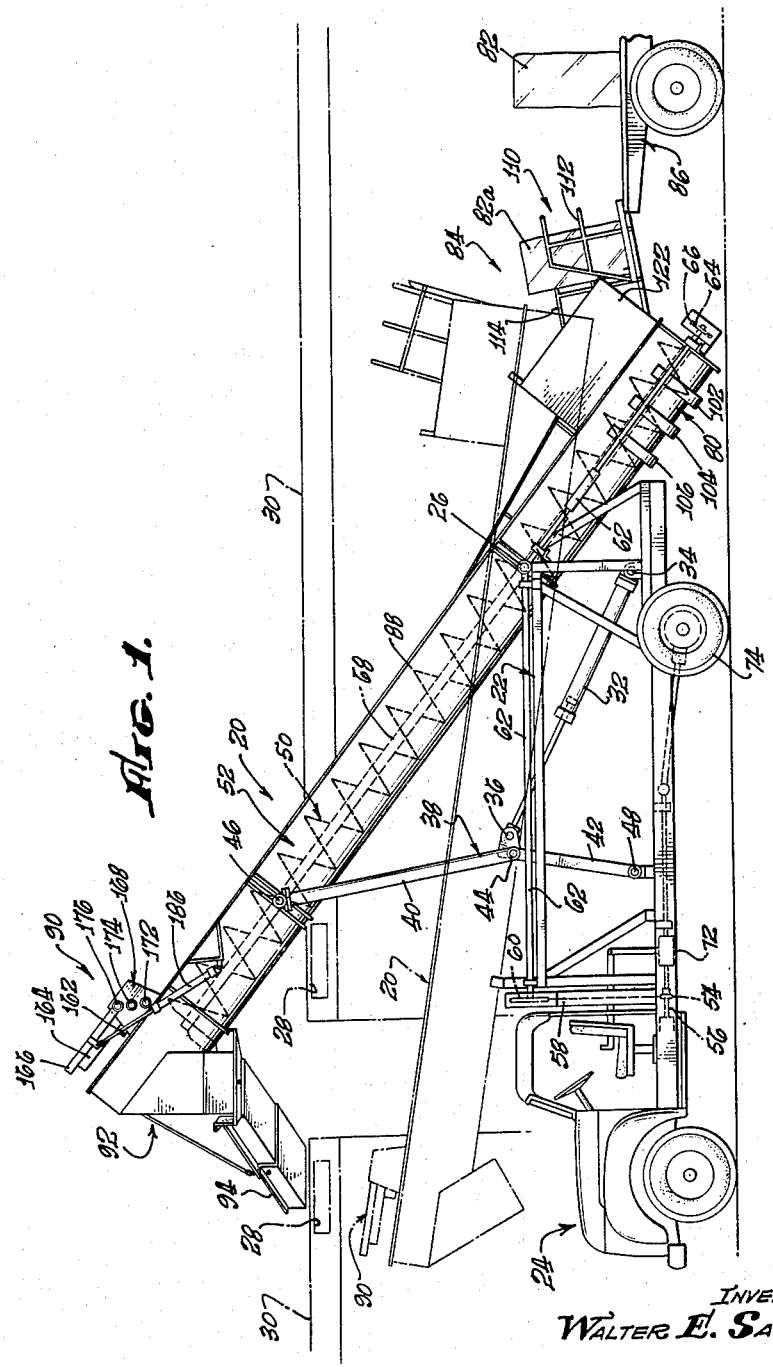
Fig. 1 is a side elevational view of a mobile ice breaking apparatus of the invention specifically designed to ice refrigerator cars.

Figs. 4 and 5 are further enlarged, fragmentary sectional views respectively taken along the arrowed lines 4—4 and 5—5 of Figs. 3 and 2, respectively;

Fig. 6 is a fragmentary side elevational view of a toothed convolution of a screw conveyor flight forming part of the ice breaking means mentioned and is taken as indicated by the arrowed line 6—6 of Fig. 4;

Fig. 7 is an enlarged, fragmentary side elevational view of a portion of the ice breaking apparatus of the invention and duplicates a portion of Fig. 1;

Fig. 8 is an enlarged, fragmentary side elevational view similar to Fig. 7, but taken from the opposite side of the ice breaking apparatus of the invention;

Fig. 9 is an enlarged sectional view taken along the arrowed line 9—9 of Fig. 8;

Figs. 10, 11 and 12 are sectional views respectively taken along the arrowed lines 10—10, 11—11 and 12—12 of Fig. 9; and Fig. 13 is an enlarged sectional view taken along the arrowed line 13—13 of Fig. 10 of the drawings.

Referring first to Fig. 1 of the drawings, the ice breaking apparatus of the invention is designated generally by the numeral 20 and, in the particular construction illustrated, is mounted on a superstructure 22 carried by a motor truck 24, the apparatus 20 being mounted on the superstructure by pivot means 26 and being movable about the axis of such pivot means between an elevated, operative position, shown in solid lines, and a retracted, inoperative position, shown in broken lines. When in its elevated position, the ice breaking apparatus 20 may be utilized to deliver blocks of ice of various predetermined sizes to charging hatches 28 of refrigerated freight cars 30 standing on a track, not shown, adjacent which the truck 24 is positioned in parallel relation to the track. The ice breaking apparatus 20 may be pivoted between its elevated and retracted positions by a hydraulic unit 32 pivotally connected to the truck 24 at 34 and pivotally connected at 36 to a linkage 38 connecting the apparatus 20 to the truck. This linkage includes links 40 and 42 pivotally interconnected, at 44, adjacent the pivot 36, the link 40 being pivotally connected to the apparatus 20 at 46 and the link 42 being pivotally connected to the truck 24 at 48. As will be apparent, extension of the hydraulic unit 32 results in movement of the ice breaking apparatus 20 into its elevated position, while contraction of the hydraulic unit results in movement of the apparatus to its retracted position.

It will be understood that the links 40 and 42 are preferably double links, the two halves of the former receiving the apparatus 20 therebetween and the two halves of the latter being connected to the truck 24 at transversely spaced points by the pivot or pivot means 48.

The ice breaking apparatus of the invention includes a screw conveyor 50 rotatable in a screw conveyor housing 52 which is connected to the superstructure 22 by the pivot means 26 and to the link 40 by the pivot or pivot means 46. The screw conveyor 50 is driven by the motor of the truck 24 in the particular construction illustrated through a power take-off arrangement which includes a sprocket 54 on the drive shaft 56 of the truck, a chain 58 trained around the sprocket 54 and a sprocket 60 on a flexible shaft 62 mounted on the superstructure 22 of the truck. The flexible shaft 62 is provided at one end with a sprocket 64 which drives a sprocket 66, Figs. 1, 2 and 3, on the shaft 68 of the screw conveyor 50 through a chain 70. A clutch 72 interposed between the sprocket 54 on the drive shaft 56 and the drive wheels 74 of the truck 24 disconnects the drive wheels from the drive shaft when the power take-off for driving the screw conveyor 50 is in operation.

The screw conveyor 50 provides at its inlet end means 80 for breaking standard blocks 82 of ice into blocks of intermediate size, the apparatus 20 providing means 84 for charging the ice breaking means 80 with the blocks 82. The blocks 82 of ice may be supplied to the charging means 84 from a truck 86 as a matter of convenience. With this arrangement, the truck 86 may be backed into position adjacent the charging means 84 whenever a previous truck load of ice has been processed by the apparatus 20. However, other means of supplying the ice blocks 82 to the charging means 84 may be utilized.

The intermediate blocks of ice produced by the ice breaking means 80 are conveyed upwardly and forwardly by the screw conveyor 50, these intermediate blocks being disposed between the convolutions of the helical flight 88 of the screw conveyor. At the outlet end of the conveyor 50 is a selective ice breaking mechanism 90 capable of breaking the intermediate blocks of ice into small blocks of various predetermined, controlled sizes. Alternatively, as will be explained hereinafter, the ice breaking mechanism 90 may be rendered completely inoperative to permit the blocks of intermediate size produced by the ice breaking means 80 to be discharged from the outlet end of the screw conveyor housing 52. The blocks of ice discharged from the outlet end of the conveyor 50 are conveyed to the charging hatches 28 of the refrigerator cars 30 by a discharge means 92 shown as comprising a discharge chute 94 adapted to be swung to one side or the other, depending on whether refrigerator cars to the left or right of the truck 24 are to be charged with ice.

Considering the ice breaking means 80, it includes, as best shown in Figs. 2, 3 and 4, two circumferentially extending picks or teeth 96 and 98 mounted on the periphery of the conveyor flight 88 on the adjacent convolutions thereof and running in perforated channels 102 and 104, respectively, which form enlargements of the housing 52. The tooth 96 is so spaced axially from an inlet end wall 100 of the housing 52 and the tooth 98 is so spaced axially from the tooth 96 that these teeth fracture a standard block of ice dropped into the housing 52 into three intermediate blocks of substantially equal size. The screw conveyor housing 52 is, as best shown in Fig. 4, a relatively deep trough of U-shaped cross section so that, when a standard block of ice is dropped into the housing 52 onto the screw conveyor 50 adjacent the inlet end wall 100 in a manner to be described, the teeth 96 and 98 force the block against one side of the housing, as shown in Fig. 4, and fracture the block into three equal-sized intermediate blocks by a combined cutting and splitting action, the points of the teeth facing in the direction of rotation of the screw conveyor, as will be evident from Fig. 4. The combined cutting and splitting action of the teeth 96 and 98 results in fracturing of the large block into three intermediate blocks relatively cleanly with a minimum of small fragments. The housing 52 is provided with a third perforated channel 106 downstream from the channel 104 in the particular construction illustrated. This third channel may receive a third ice breaking tooth on the conveyor flight 88 in some instances.

As each large block of ice is broken into three intermediate blocks in the foregoing manner, the intermediate blocks drop downwardly between the convolutions of the conveyor flight 88 and are displaced toward the outlet end of the screw conveyor 50. The intermediate blocks may be delivered to the discharge means 92 without further breakage, or they may be broken into small blocks by the ice breaking mechanism 90, as will be described hereinafter.

Considering the charging means 84, it includes a loading means having the form of a loading frame or chute 110 located rearwardly of and to one side of the ice breaking means 80 formed by the inlet end of the screw conveyor 50. The loading frame 110 includes sides 112 and 114 of open framework construction, these sides being connected by a bottom 116. The spacing of the sides 112 and 114 of the loading frame 110 is slightly greater than the thickness of a standard block of ice so that such block of ice can be inserted between the sides of the loading frame with its major transverse axis parallel to such sides, but cannot be inserted therebetween with its major transverse axis perpendicular thereto. As shown in Figs. 1, 2 and 3, the loading frame 110 is intended to receive a standard block of ice on end, as indicated by the block 82a.

The loading frame 110 is connected at its forward end to a frame 118 carried by the screw conveyor housing 52 by a pivot means 120 which provides a pivot axis extending transversely of the axis of the screw conveyor 50 and located above the inlet end of the screw conveyor. As previously mentioned, the loading frame 110 is located to one side of the screw conveyor housing 52, and is also located to one side of a charging box 122 mounted on top of the screw conveyor housing 52 at the inlet end thereof, this charging box having a side opening 124, on the same side thereof as the loading frame 110, through which a block of ice may be introduced and dropped onto the ice breaking means 80, as will be described. The rearward end, 126, of the loading frame 110 is adapted to rest on the rear end of the bed of the truck 86, the pivot means 120 accommodating truck beds of different heights.

When the loading frame 110 rests on the truck 86, an operator may readily slide a block of ice from the truck into the loading frame 110 on end, as indicated by the block 82a, the bottom 116 of the loading frame being flush with or slightly below the bed of the truck 86 under such conditions.

The block of ice is tipped onto a gate means 130 on edge, as will be described in more detail hereinafter. The gate means 130 comprises a gate 132 which is aligned with the loading frame 110 so that a block of ice tipped from the loading frame lands on the gate 132 on edge, as indicated by the numeral 82c. The gate 132 is connected to the frame 118 by a pivot means 134, Figs. 4 and 5, which provides a pivot axis generally parallel to the axis of the screw conveyor 50 and substantially perpendicular to and substantially intersecting the pivot axis of the loading frame 110. The pivot means 134 is located along the outer edge of the gate 132 with respect to the screw conveyor 50 so that the gate is pivotable downwardly toward the ice breaking means 80 from an operaive position to an inoperative position, the gate being operative to prevent movement of a block of ice into engagement with the ice breaking means when it is in its operative position, but permitting movement of the block of ice downwardly onto the ice breaking means when in its inoperative position. In Fig. 4 of the drawings, the gate 132 is shown in its inoperative position, the gate being biased upwardly toward its operative position by a tension spring 136.

The invention provides an interlock between the loading frame 110 and the gate 132 which prevents movement of the gate from its operative position to its inoperative position to discharge a block of ice onto the ice breaking means 80 until such time as an L-shaped transfer means or transfer member 140, which is connected to the gate 132 by a pivot means 142 having a pivot axis adjacent and parallel to the axis of the pivot means 120 when the gate is in its operative position, as will be apparent from Figs. 3 and 4 of the drawings, is pivoted relative to the gate 132 from a first position, wherein it forms an extension of the bottom 116 of the loading frame 110, to a second position wherein it forms an extension of the gate.

Considering the transfer member 140 in more detail, when it is in its first position, an arm 144 thereof forms a part of the bottom 116 of the loading frame 110, as shown in solid lines in Fig. 2 and in broken lines in Fig. 3. The transfer member 140 also includes an arm 146 which, as best shown in Fig. 3, forms a part of the gate 132 when the transfer member is in its second position. The arm 144 of the transfer member 140 is heavier than the arm 146 thereof and acts to bias the transfer member toward its first position when it is in its second position because of the fact that the two arms 144 and 146 the inclined at substantially equal, but opposite, angles from the vertical when the transfer member is in its second position. Thus, the transfer member normally occupies its first position, wherein it forms an extension of the bottom 116 of the loading frame 110.

When the block of ice 82a, Fig. 2, is placed in the loading frame 110 by the operator, the lower end of the block slides onto the arm 144 of the transfer member 140. As the block 82a slides forwardly into the angle formed by the L-shaped transfer member, indicated by the block of ice 82b in Figs. 2 and 3, the weight and inertia of the block 82b causes it to tip onto the gate 132 into the position occupied by the block 82c and, in so doing, it pivots the transfer member 140 from its first position to its second position, wherein the arm 146 of the transfer member forms a part of the gate.

Under these conditions, the arm 144 of the transfer member 140 clears the side 112 of the loading frame 110 to permit pivoting of the gate into its inoperative position. In Fig. 3, a rod or pipe 148 forming part of the side 112 of the loading frame 110 is shown as being cleared by the outer end of the arm 144 of the transfer member 140. Thus, under the conditions illustrated in Fig. 3, the gate 132 has just been released for pivotal movement from its operative position to its inoperative position to permit dropping a block of ice carried by the gate onto the ice breaking means 80. This interengagement between the transfer member 140 and the loading frame 110 prevents movement of the gate 132 into its inoperative position except when the transfer member is in its first position. When the transfer member is in its second position, the gate cannot pivot into its inoperative position due to interengagement of the arm 144 of the transfer member and the side 113 of the loading frame. Thus, the gate 132 is released for pivotal movement into its inoperative position only when the transfer member 140 has been pivoted into its second position by a block of ice.

The foregoing interlock prevents inadvertent delivery of a block of ice to the ice breaking means 80 and also serves as a safety device tending to prevent injury to personnel. For example, if the operator is standing on the gate 132 for any reason, the transfer member 140 prevents release of the gate due to the fact that it is in its first position when no block of ice is present on the gate. Thus, it is impossible for the operator to be thrown onto the ice breaking means 80 through release of the gate 132, even if the operator steps over the arm 146 of the transfer member 140 onto the gate with the screw conveyor 50 in operation for any reason. Also, the structure of the loading frame 110 is such as to prevent accidental movement of an operator therethrough onto the gate, due to the relatively narrow width of the loading frame to receive a block of ice oriented as hereinbefore described. As another safeguard, a railing 150 is provided outwardly of the gate 132 opposite the side opening 124 in the charging box 122, this railing preventing an operator from falling into the charging box from the side.

Referring now to Fig. 4 of the drawings, when a block of ice, such as the block 82c, has been deposited on the gate 132 on edge in the foregoing manner and the transfer member 140 has been pivoted back into its first position, the weight of the block 82c overcomes the resistance offered by the spring 136 as soon as the arm 144 of the transfer member 140 clears the side 112 of the loading frame, whereupon the gate pivots downwardly into its inoperative position, as shown in Fig. 4. When the gate 132 reaches its inoperative position, it engages a stop 152.

The invention provides means 154 carried by the gate 132 for tipping the block of ice onto the ice breaking means 80 on its side as the block enters the charging box 122 and falls onto the toothed portion of the screw conveyor 50. This tipping means is shown as consisting of a bar 156 secured to the edge of the gate 132 nearest the screw conveyor 50, the bar projecting above the gate so that, in effect, the block of ice stubs its toe on the bar 156 as the gates moves into its inoperative position, whereupon the block of ice lands on the toothed portion of the conveyor on its side. The reference character 82d in Fig. 4 shows the block of ice in the act of tipping from the gate 132 into the charging box 122, while the reference character 82e shows the block of ice after landing on the toothed portion of the screw conveyor on its side as a result of having been tipped by the tipping means 154. The reference character 82f illustrates how the block drops downwardly between the convolutions of the conveyor flight 88 as it is fractured into three parts by the teeth 96 and 98.

After each large block has been delivered to the ice breaking means 80 and has been broken into three so-called intermediate blocks thereby in the manner hereinbefore described, the intermediate blocks are displaced toward the outlet end of the screw conveyor housing 52 by the screw conveyor 50, the pitch of the conveyor flight 88 being such that the intermediate blocks ride between the convolutions thereof.

Considering now the ice breaking mechanism 90, it includes block splitting members 162, 164 and 166 mounted on a frame 168, carried by the outlet end of the screw conveyor housing 52, by pivot means 172, 174 and 176, respectively. The block splitting members 162, 164 and 166 are pivotable from inoperative positions, shown in Figs. 7 and 8 of the drawings, wherein they clear the outlet end of the screw conveyor housing 52, to operative positions wherein they at least partially span the outlet end of the screw conveyor housing so as to split into smaller blocks the intermediate blocks extruded therepast by the screw conveyor 50. The block splitting members 162, 164 and 166 are movable between their operative and inoperative positions by hydraulic units 182, 184 and 186 respectively pivotally connected thereto and pivotally connected to the screw conveyor housing 52. These hydraulic units may be controlled by suitable selector valves, not shown, located at a convenient control station, which may be adjacent the charging means 84.

The block splitting or breaking members 162, 164 and 166, as will be discussed in more detail hereinafter, have different configurations and are adapted to break blocks extruded therepast by the screw conveyor 50 into smaller blocks of different, predetermined sizes. In order to permit a selection of the final size of the blocks delivered to the discharge means 92, the block splitting members are selectively movable into their operative positions. More accurately, the block splitting members 162, 164 and 166 are sequentially movable into their operative positions in the order recited in the particular construction illustrated. In a general sense, however, the block splitting members 162, 164 and 166 are seleectively operative.

As best shown in Figs. 9 and 10, the block splitting member 162 includes a bar 192 which swings between its operative and inoperative positions in a plane bisecting the screw conveyor housing 52 and which is provided with teeth or picks 193 extending axially of the screw conveyor 50 toward the inlet end thereof. The length of the bar 192 is such that it extends downwardly at least substantially to the axis of rotation of the screw conveyor 50 when it is in its operative position. It is unnecessary for the bar 192 to extend all the way across the outlet end of the screw conveyor housing 52 in the particular construction illustrated since the so-called intermediate blocks, one of which is indicated by the reference character 82g, in Fig. 9, are carried by the screw conveyor 50 above the shaft 68 thereof, being prevented from rotating with the screw conveyor to a position at one side of the shaft 168, or below the shaft, by engagement with the side walls of the screw conveyor housing.

As will be apparent, when the block splitting member 162 is in its operative position, the toothed bar 192 thereof splits each intermediate block 82g into substantially equal parts as such block is extruded therepast by the screw conveyor. This splitting or breaking of the block 82g into two parts occurs with a minimum of small fragments with the toothed bar 192 shown, which is an important feature.

As best shown in Fig. 11, the block splitting member 164 includes two bars 194 provided with teeth 195 identical to the teeth 193, the bars 194 swinging between their operative and inoperative positions in planes parallel to the plane of motion of the bar 192 and located on opposite sides of the latter plane equal distances therefrom. As will be apparent, as each intermediate block 82g is split into two parts by the toothed bar 192, the two halves of the block 82g encounter the toothed bars 194, respectively, these being so spaced laterally from the bar 192 that they split the block 82g substantially into quarters as the screw conveyor 50 extrudes the halves of the block 82g therepast.

The two halves into which each so called intermediate block 82g is split by the toothed bar 192 may drop downwardly in the screw conveyor housing 52 on opposite sides of the shaft 68 because of their reduced sizes, the halves of each block 82g no longer being restrained to ride above the shaft by the sides of the housing. However, the locations of the toothed bars 194 are such that each half of the block 82g will be broken into approximately equal parts.

The block splitting member 166 includes two bars 196 which extend radially from the axis of the pivot means 176 and which carry two transverse bars 198 having thereon teeth 199 corresponding to the teeth 193, the bars 198 being located substantially equal distances above and below the axis of the screw conveyor 50 when the block splitting member 166 is in its operative position. The toothed bars 198 split each block produced by the toothed bars 194 into substantially equal parts to produce blocks of minimum size.

The ice breaking mechanism 90 includes a fixed, serrated bar 200 carrying a bearing, not shown, for the shaft 68 and extending below the shaft 68 in alignment with the operative position of the toothed bar 192. This fixed bar 200 splits any fragments which may drop downwardly into the bottom of the screw conveyor housing 52.

Operation

In operation, large blocks of ice to be broken are placed in the loading frame 110 on end one at a time. After a block, such as the block 82a, has been placed in the loading frame 110 on end, it slides along the bottom 116 of the loading frame 110 with sufficient momentum to cause it to tip through the position 82b onto the gate 132 on edge, as shown by the block 82c in Fig. 3. As the block tips onto the gate 132, it pivots the transfer member 140 from its first position to its second position, the transfer member now forming a part of the gate 132, whereas the arm 144 thereof previously formed a part of the bottom 116 of the loading frame 110.

With the block 82c resting on the gate 132, the side 112 of the loading frame 110 clears the outer end of the arm 144 of the transfer member 140 to permit the gate 132 to pivot from its operative position to its inoperative position under the influence of the weight of the block 82c, which overcomes the bias of the spring 136.

The foregoing interlock between the loading frame 110 and the transfer member 140 positively prevents release of the gate 132 for movement to its inoperative position until the transfer member 140 has been moved into its second position by a block of ice. The gate 132 cannot move to its inoperative position as long as the transfer member is in its first position. This prevents inadvertent delivery of a block of ice to the ice breaking means 80 and, as hereinbefore discussed in more detail, virtually eliminates any possibility of injury to personnel.

With the block of ice 82c resting on the gate 132 on edge and retaining the transfer member 140 in its second position, the gate is released for movement to its inoperative position, wherein the gate is inclined downwardly toward the ice breaking means 80 formed by the toothed convolutions of the conveyor flight 88. When the gate 132 is inclined downwardly toward the ice breaking means 80 in this manner, the block 82c tends to slide down the gate into the charging box 122, the tipping means 154 causing the block to tip into the charging box, as indicated by the reference character 82d, and to land on the toothed convolutions of the conveyor on its side, as indicated by the reference character 82e.

As soon as the block has been tipped into the position 82e in the foregoing manner, the spring 136 returns the gate 132 to its operative position, and the action of gravity then returns the transfer member 140 to its first position, due to the action of gravity on the heavier arm 144 when the arms 144 and 146 are inclined at substantially equal, but opposite, angles from the vertical with the transfer member 140 in its second position. Thus, the transfer member 140 again forms an extension of the bottom 116 of the loading frame 110 and thus renders the charging means 84 available to receive another block of ice from the truck 86 in the manner hereinbefore described.

Meanwhile, the teeth 96 and 98 on the conveyor flight 88 cut and/or split the block 82e into three substantially equal parts, which then settle downwardly between the convolutions of the conveyor flight, as indicated by the reference character 82f. The three so called intermediate blocks produced in the foregoing fashion are then displaced toward the outlet end of the housing 52 by the screw conveyor 50.

The intermediate blocks may be delivered to the discharge means 92 without further breakage by moving all of the splitting members 162, 164 and 166 to their inoperative positions. Alternatively, each intermediate block 82g, Fig. 9, may be split into two parts by moving the splitting member 162 into its operative position. Or, each intermediate block 82g may be split into four approximately equal parts by activating both the splitting member 162 and the splitting member 164. As still another alternative, each intermediate block 82g may be split into eight more or less equal parts by moving all of the splitting members 162, 164 and 166 to their operative positions. Thus, the present invention provides a means for producing ice blocks of a wide variety of predetermined, controlled sizes, ranging from relatively large blocks when all of the splitting members 162, 164 and 166 are inactive, to relatively small blocks when all of these splitting members are in their operative positions.

Although an exemplary embodiment of the invention has been disclosed herein for purposes of illustration, it will be understood that various changes, modifications and substitutions may be incorporated in such embodiments without departing from the spirit of the invention as defined by the claims which follow.

What is claimed is:

1. In an ice breaking apparatus, the combination of: ice breaking means; gate means movable from an operative position to an inoperative position to admit a block of ice to said ice breaking means, said gate means preventing movement of the block of ice into engagement with said ice breaking means when said gate means is in its operative position; transfer means movable from a first oposition to a second position to move the block of ice into engagement with said gate means; loading means for delivering the block of ice to said transfer means; and stop means, including interengageable elements on said loading means and said transfer means, for preventing movement of said gate means from its operative position to its inoperative position when said transfer means is in its first position.

2. In an apparatus for breaking a block of ice, the combination of: a supporting structure; ice breaking means carried by said supporting structure and including a screw conveyor; gate means mounted on said supporting structure for pivotal movement from an operative position downwardly toward said screw conveyor into an inoperative position about a pivot axis substantially parallel to the axis of rotation of said screw conveyor, for preventing movement of the block of ice into engagement with said screw conveyor when it is in its operative position and for permitting such movement when it is in its inoperative position; and means for tipping the block of ice into engagement with said screw conveyor as said gate means pivots into its inoperative position.

3. In an apparatus for breaking a block of ice, the combination of: supporting structure; ice breaking means carried by said supporting structure and including a screw conveyor; gate means mounted on said supporting structure for pivotal movement from an operative position downwardly toward said screw conveyor into an inoperative position about a pivot axis substantially parallel to the axis of rotation of said screw conveyor, for preventing movement of the block of ice into engagement with said screw conveyor when it is in its operative position and for permitting such movement when it is in its inoperative position, said gate means being movable back and forth between said operative and inoperative positions; and means carried by said gate means for tipping the block of ice into engagement with said screw conveyor as said gate means pivots into its inoperative position.

4. In an apparatus for breaking a block of ice, the combination of: a supporting structure; ice breaking means carried by said supporting structure and including a screw conveyor; gate means mounted on said supporting structure for pivotal movement from an operative position downwardly toward said screw conveyor into an inoperative position about a pivot axis substantially parallel to the axis of rotation of said screw conveyor, for preventing movement of the block of ice into engagement with said screw conveyor when it is in its operative position and for permitting such movement when it is in its inoperative position; transfer means movable from a first position to a second position to move the block of ice into engagement with said gate means; and stop means for preventing movement of said gate means from its operative position to its inoperative position when said transfer means is in its first position.

5. In an apparatus for breaking a block of ice, the combination of: a supporting structure; ice breaking means carried by said supporting structure and including a screw conveyor; gate means mounted on said supporting structure for pivotal movement from an operative position downwardly toward said screw conveyor into an inoperative position about a pivot axis substantially parallel to the axis of rotation of said screw conveyor, for preventing movement of the block of ice into engagement with said screw conveyor when it is in its operative position and for permitting such movement when it is in its inoperative position; means carried by said gate means for tipping the block of ice into engagement with said screw conveyor as said gate means pivots into its inoperative position; transfer means movable from a first position to a second position to move the block of ice into engagement with said gate means; and stop means for preventing movement of said gate means from its operative position to its inoperative position when said transfer means is in its first position.

6. In an apparatus for breaking a block of ice, the combination of: a supporting structure; ice breaking means carired by said supporting structure and including a screw conveyor; gate means mounted on said supporting structure for pivotal movement from an operative position downwardly toward said screw conveyor into an inoperative position about a pivot axis substantially parallel to the axis of rotation of said screw conveyor, for preventing movement of the block of ice into engagement with said screw conveyor when it is in its operative position and for permitting such movement when it is in its inoperative position; loading means; transfer means mounted on said gate means for pivotal movement, about a pivot axis extending transversely of said pivot axis of said gate, between a first position wherein it forms an extension of said loading means and a second position wherein it forms an extension of said gate means, for tipping a block of ice from said loading means onto said gate means; and stop means, including interengageable elements on said loading means and on said transfer means, for preventing movement of said gate means into its inoperative position when said transfer means is in its first position, whereby said stop means permits movement of said gate means into its inoperative position, to permit movement of the block of ice into engagement with said screw conveyor, only when said transfer means is in its second position.

7. An apparatus as defined in claim 6 wherein said transfer means is L-shaped.

8. In an apparatus for breaking a block of ice, the combination of: a supporting structure; ice breaking means carried by said supporting structure and including a screw conveyor; gate means mounted on said supporting structure for pivotal movement from an operative position downwardly toward said screw conveyor into an inoperative position about a pivot axis substantially parallel to the axis of rotation of said screw conveyor, for preventing movement of the block of ice into engagement with said screw conveyor when it is in its operative position and for permitting such movement when it is in its inoperative position; means carried by said gate means for tipping the block of ice into engagement with said screw conveyor as said gate means pivots into its inoperative position; L-shaped transfer means, mounted on said gate means for pivotal movement from a first position into a second position about a pivot axis extending transversely of said pivot axis of said gate and said axis of rotation of said screw conveyor, for tipping the block of ice into said gate means; loading means to deliver a block of ice to said transfer means; and stop means, including inter-engageable elements on said loading means and on said transfer means, for preventing movement of said gate means into its inoperative position when said transfer means is in its first position, whereby said stop means permits movement of said gate means into its inoperative position, to permit movement of the block of ice into engagement with said screw conveyor, only when said transfer means is in its second position.

9. In an apparatus for breaking a block of ice, the combination of: a supporting structure; ice breaking means carried by said supporting structure and including a screw conveyor having inlet and outlet ends, said screw conveyor being inclined upwardly toward its outlet end and having a flight provided with ice breaking teeth thereon; gate means mounted on said supporting structure for pivotal movement from an operative position downwardly toward said screw conveyor into an inoperative position about a pivot axis substantially parallel to the axis of rotation of said screw conveyor, for preventing movement of the block of ice into engagement with said screw conveyor when it is in its operative position and for permitting such movement when it is in its inoperative position; and means for tipping the block of ice into engagement with said screw conveyor as said gate means pivots into its inoperative position.

10. In an ice breaking apparatus, the combination of: a screw conveyor housing having inlet and outlet ends; a screw conveyor in said screw conveyor housing and having a fl'ght the convolutions of which are adapted to receive blocks of ice therebetween; and a block splitting member extending at least part way across said outlet end of said screw conveyor housing so as to split blocks of ice extruded therepast by said screw conveyor.

11. In an ice breaking apparatus, the combination of: a screw conveyor housing having inlet and outlet ends; a screw conveyor in said screw conveyor housing and having a flight the convolutions of which are adapted to receive blocks of ice therebetween; and a plurality of block splitting members each extending at least part way across said outlet end of said screw conveyor housing so as to split blocks of ice extruded therepast by said screw conveyor.

12. In an ice breaking apparatus, the combination of: a screw conveyor housing having inlet and outlet ends; a screw conveyor in said screw conveyor housing and having a flight the convolutions of which are adapted to receive blocks of ice therebetween; and a block splitting member movable from an inoperative position clear of said outlet end of said screw conveyor housing to an operative position wherein its extends at least part way across said outlet end of said screw conveyor housing so as to split blocks of ice extruded therepast by said screw conveyor; and means for moving said block splitting member between its operative and inoperative positions.

13. In an ice breaking apparatus, the combination of: a screw conveyor housing having inlet and outlet ends; a screw conveyor in said screw conveyor housing and having a flight the convolutions of which are adapted to receive blocks of ice therebetween; a plurality of block splitting members each movable from an inoperative position clear of said outlet end of said screw conveyor housing to an operative position wherein it extends at least part way across said outlet end of said screw conveyor housing so as to split blocks of ice extruded therepast by said screw conveyors; and means for moving said block splitting members between their respective operative and inoperative positions selectively.

14. In an ice breaking apparatus, the combination of: a screw conveyor housing having inlet and outlet ends; a screw conveyor in said screw conveyor housing and having a flight the convolutions of which are adapted to receive blocks of ice therebetween; a plurality of block splitting members each movable from an inoperative position clear of said outlet end of said screw conveyor housing to an operative position wherein it extends at least part way across said outlet end of said screw conveyor housing so as to split blocks of ice extruded therepast by said screw conveyor, each of said block splitting members including at least one bar and including a plurality of picks carried by said bar facing toward said inlet end of said screw conveyor housing; and means for moving said block splitting members between their respective operative and inoperative positions selectively.

15. In an ice breaking apparatus, the combination of: a screw conveyor housing having inlet and outlet ends; ice breaking means including a screw conveyor in said screw conveyor housing and having a flight certain of the convolutions of which are provided with ice breaking teeth thereon and the convolutions of which are adapted to receive therebetween blocks of ice formed by said ice breaking teeth; a plurality of block splitting members each movable from an inoperative position clear of said outlet end of said screw conveyor housing to an operative position wherein it extends at least part way across said outlet end of said screw conveyor housing so as to split blocks of ice extruded therepast by said screw conveyor, each of said block splitting members including at least one bar and including a plurality of picks carried by said bar and facing toward said inlet end of said screw conveyor housing; and means for moving said block splitting members between their respective operative and inoperative positions selectively.

16. In an ice breaking apparatus, the combination of: a screw conveyor housing having inlet and outlet ends; ice breaking means including a screw conveyor in said screw conveyor housing and having a flight certain of the convolutions of which are provided with ice breaking teeth thereon and the convolutions of which are adapted to receive therebetween blocks of ice formed by said ice breaking teeth; and means for positioning a block of ice in engagement with said screw conveyor in a location such that said block is broken into smaller blocks of substantially equal size.

17. In an ice breaking apparatus, the combination of: ice breaking means; transfer means movable back and forth between a first position and a second position for delivering a block of ice to said ice breaking means when said transfer means is in said second position; and means interlockably engageable with said transfer means in said first position of said transfer means for preventing movement of the block of ice into engagement with said ice breaking means when said transfer means is in its first position.

18. In an ice breaking apparatus, the combination of: ice breaking means; gate means movable back and forth between an operative position and an inoperative position for admitting a block of ice to said ice breaking means when said gate means is in said inoperative position, said gate means preventing movement of the block of ice into engagement with said ice breaking means when said gate means is in its operative position; transfer means movable back and forth between a first position and a second position for moving the block of ice into engagement with said gate means when said transfer means is in said second position; and means interlockably engageable with said transfer means in said first position of said transfer means for preventing movement of said gate means from its operative position to its inoperative position when said transfer means is in its first position.

19. In an ice breaking apparatus, the combination of: a supporting structure providing a path of movement for a block of ice to be split; conveyor means carried by said supporting structure and engageable with the block of ice for moving same along said path; a splitting member extending at least part way across said path, whereby a block of ice moved along said path by said conveyor means is split by said splitting member; and supporting means for said splitting member connected to said supporting structure and said splitting member and spaced laterally from said path, whereby said conveyor means moves said block of ice, after splitting thereof by said splitting member, past said splitting member along said path.

20. An ice breaking apparatus as set forth in claim 19 wherein said supporting means for said splitting member includes means for moving said splitting member out of said path.

References Cited in the file of this patent

UNITED STATES PATENTS

| | | |
|---|---|---|
| 2,058,727 | Schreiber | Oct. 27, 1936 |
| 2,078,379 | Grayson et al. | Apr. 27, 1937 |
| 2,097,219 | MacVean | Oct. 26, 1937 |
| 2,100,937 | Bowe | Nov. 30, 1937 |
| 2,321,125 | Brady | June 8, 1943 |
| 2,587,872 | McLain | Mar. 4, 1952 |
| 2,654,358 | Lake | Oct. 6, 1953 |